J. H. MYERS.
HARVESTER RAKE.
No. 187,296. Patented Feb. 13, 1877.
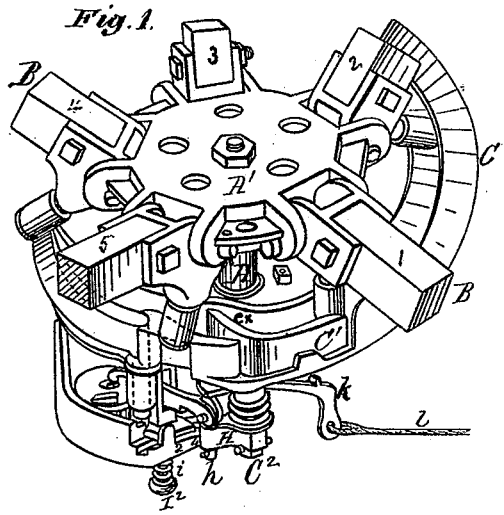
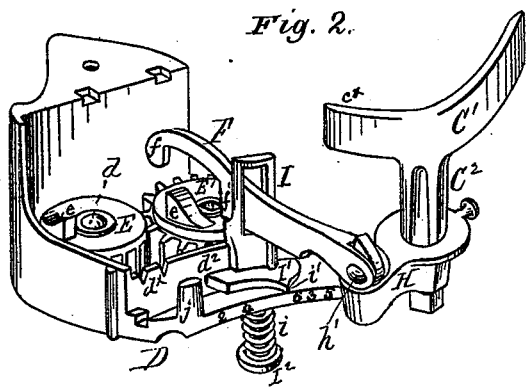
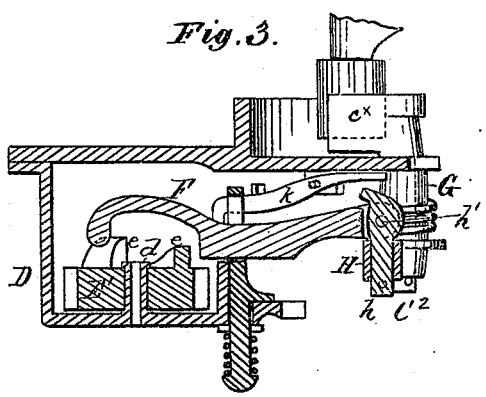
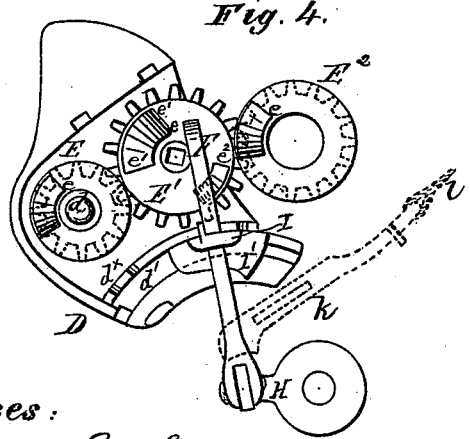
Witnesses:
Alexander Mahon
John G. Center
Inventor:
Jacob H. Myers
by A. M. Smith
Attorney

UNITED STATES PATENT OFFICE.

JACOB H. MYERS, OF ROCHESTER, NEW YORK.

IMPROVEMENT IN HARVESTER-RAKES.

Specification forming part of Letters Patent No. 187,296, dated February 13, 1877; application filed May 20, 1876.

*To all whom it may concern:*

Be it known that I, JACOB H. MYERS, of Rochester, county of Monroe, State of New York, have invented certain new and useful Improvements in Harvester-Rakes, of which the following is a full, clear, and exact description, reference being had to the accompanying drawings, making part of this specification, in which—

Figure 1 is a perspective view of a rake-cam, and the revolving head of a revolving rake and reel, with my improvements applied. Fig. 2 is a similar view of the devices for controlling the path of the rake and reel arms, detached from the rake-standard. Fig. 3 is a vertical section through, and Fig. 4 a plan view of, said devices.

Similar letters of reference denote corresponding parts wherever used.

The invention relates to that class of harvesters employing what is commonly known as a combined rake and reel, in which any one or all of the revolving rake and reel arms may be made to rake the grain from the platform at the will of the operator, and consists in a novel means for enabling the operator, without the necessity of removing or applying any part, and without disturbing the relation or fixed position of the gearing, to regulate instantly and with precision the number of arms which shall act as reel-arms prior to the delivery of each gavel, and thus to deliver the gavels automatically by every second, third, fourth, fifth, or sixth arm, and so on, as the condition of the crop may require—that is to say, a device which may be set by the operator to cause the grain to be raked off automatically at regular intervals, and, when thus set, may cause a given or specific arm to act during one revolution as a rake-arm and during the next revolution as a reel-arm, without action by or control from the attendant, as hereinafter explained.

The invention further consists in the application or arrangement of differential-gear trip-wheels meshing into each other, and having any accurately proportional number of cogs in each wheel, which number must be susceptible of being divided in such manner that each rake-arm will be represented by a specific or uniform number of cogs, each of said gear-wheels being provided with one or more projecting spurs or inclined planes, which, in the revolution of wheel, trips or lifts the tripping-latch and releases the switch-gate, permitting the latter to be thrown open, as hereinafter explained.

The revolving rake and reel, with its guiding cam and driving mechanism, and the machine to which it is applied, may be of any approved construction and arrangement, and need not, therefore, be here described further than is necessary to an understanding of my improvement.

In the accompanying drawings, A represents the rake and reel shaft; A', the revolving head or disk to which the rake and reel arms B are hinged; and C, the guiding-cam, with its switch-gate $C^1$, which parts, together with the supporting-standard, may be of any usual or preferred construction. Underneath the cam-plate, and secured thereto or to the rake-standard, or both, by any convenient arrangement of flanges and bolts, is an angular plate or bracket, D, provided on its horizontal portion with vertical posts or shafts $d$, upon which are mounted gear-wheels E $E^1$, which mesh with each other, the inner wheel, $E^1$, meshing in turn with and receiving its motion from a similar wheel, $E^2$, (see Fig. 4,) keyed to the revolving rake-shaft. Three of these wheels are shown; but more or less may be employed, if desired. They are armed each, on their upper faces, with one or more cam projections or spurs, $e$, adapted to act upon a tripping-latch, F, as hereinafter explained.

The wheels are differentially geared, for the purpose of varying the time of their respective revolutions; but the number of cogs in each should be a multiple of the number representing each rake and reel arm.

For example, the number of rake and reel-arms shown is five, though of course this number may be varied. The gear-wheel $E^2$, which revolves with the rake-shaft, is represented as provided with fifteen cogs, which, being divided by five, gives three cogs to each rake-arm, and, as the cam projection $e$ acts upon the tripping-latch once in each revolution, it follows that one arm in the five will act as a rake-arm, when the latch is set to be acted upon by said wheel. The wheel $E^1$ is provided with eighteen or three additional cogs, representing another rake-arm. It therefore requires in its revolution one and one-fifth the time required for the wheel $E^2$; consequently where said wheel is armed with but a single cam or spur, $e$, and the tripping latch is set to be acted upon thereby, every sixth arm will be made to act as a rake arm, six being the number of rake and reel arms represented by the eighteen cogs, giving three cogs to each, as explained. But, the number eighteen being susceptible of being divided into two equal parts, each a multiple of three, it follows that the wheel $E^1$ may be provided with two cam projections or spurs, $e^1$ $e^2$, set opposite each other, and at a greater or less distance from the center than the cam $e$, and the tripping-latch being set in the path of said cams will be operated upon twice in each revolution of the wheel $E^1$, causing every third cam to act as a rake-arm. The wheel E is represented as provided with twelve teeth or cogs, and, consequently, revolves in one-fifth less time than the driver E, and the cam thereon causes every fourth arm to act as a rake-arm.

The arrangement of the tripping-latch F, in connection with the switch-gate $C^1$, is as follows: The switch has a pendent pivot, $C^2$, which passes through a vertical sleeve-bearing, G, formed on the lower face of the cam-plate, and upon which is placed a spring, $a$, connected with the gate in any convenient manner for holding it out or open, in proper position for causing the rake-arm roller to travel the inner path of an arm acting as a rake-arm, as shown in Fig. 1.

The switch-pivot $C^2$ has a crank-arm, H, secured to it, and to the outer end of this arm the tripping-latch F is secured by a vertical swiveling-pin, $h$, the latch being connected with said pin near its upper end by a horizontal pivot at $h^1$, thus providing for both a lateral swinging movement, and also for a rising and falling movement, of the latch. The outer free end of this latch overhangs one or another of the gear-wheels E $E^1$, &c., according to its adjustment, and is provided with a pendent knob, $f$, or it may have a friction-roller applied, adapting it to be acted upon by the cam-projections $e$ $e^1$.

At or near midway of its length the latch passes through a slotted adjusting and guiding standard, I, and at said point the latch is cut away on its lower face, forming a shoulder at $f^1$, adapted to drop down in front of the standard, and thus to lock the switch-gate in position for causing the rake and reel arms to act as reel-arms only. The plate or bracket D has a slot, $d^1$, formed in it, made in the arc of a circle, of which the swivel-pin $h$ is the center, and the adjusting and locking standard I arranged over said slot upon a sliding base-plate, $I^1$, cast in one piece with the standard, is provided with a vertical pin which projects down through the slot, and has a head or collar, $I^2$, upon its lower end, between which and the plate D a spring, $i$, is arranged for holding the plate $I^1$ firmly down upon the plate D.

The standard I is supported against the backward thrust of latch F by a curved vertical flange or rib, $d^2$, formed on the plate D, and the upper edge of this flange or rib is provided with a series of notches, $d^x$, with any one of which a spur on the back of the standard engages for holding said standard at the desired point of adjustment. By pressing upward upon the head $I^2$ of pendent pin on standard I, and overcoming the tension of spring $i$ the standard is disengaged from the notched rib $d^2$, and may be moved to any required point, for adjusting the swinging latch F, as desired.

The forward face of the bracket or plate D is provided with figures, 2 3 4, &c., and the relation thereto of an index, $i'$, on the plate $I'$, serves to indicate the adjustment of the latch and the number of arms, of which one will act automatically as a rake-arm. The plate D, in front of slot $d^1$, has a standard, $j$, formed upon it, adapted, when the latch F is moved over it, to hold the latch up out of engagement with the standard I and thus prevent the switch-gate from being locked in position, to cause the arms to act as reel-arms.

The operation of the parts described is as follows:

Rotary movement is imparted to the rake-shaft A and head $A'$ in the forward movement of the machine by any preferred arrangement of driving mechanism, and the switch or gate $C^1$ being in the position indicated in Fig. 1, the arm marked No. 1 will pass inside of said gate and pursue the path of a rake-arm; but the roller striking against the inwardly-projecting heel $c^x$ of said gate, and rocking it backward out of its path, it causes the gate to swing inward into position, to cause the roller of the succeeding arm to pass outside of said gate, and thus to make said arm act as a reel-arm.

In this movement of the latch it acts through the arm H on the latch F, drawing it outward until the shoulder $f'$ drops down in front of the standard I and locks the gate in position for causing the succeeding rake and reel arms to act as reel-arms only until the latch F is lifted out of engagement with the standard I by one of the projecting spurs or cams $e$, or $e^1$ $e^2$, as explained. Supposing the latch to be set to be acted on by the cam or gear-wheel $E^2$, which revolves in the same time with the rake-head; then the latch will be tripped once in each revolution of said head and the same arm, 1, will act automatically each time as a rake arm. If, now, it is desired to diminish the frequency of the raking action the standard I is adjusted to bring the latch over the inner cam or inner portion $e$ of the double-width cam $e$ $e^1$ on wheel $E^1$, as shown in the drawings, in which position it will be acted on only once in each revolution of said wheel, in which case the latch will be tripped only once for its eighteen cogs, representing six arms; consequently, only one arm in six will act as a rake-arm, and if No. 1 first acts as a rake-arm the revolving head A will complete an entire revolution, passing by No. 1, and will cause No. 2, which is the sixth arm, to act as the succeeding rake; then, after completing another revolution, No. 3 will act, and so on.

To increase the frequency of the raking action the tripping-lever may be set to be acted on by the cam or wheel E, causing one rake in four to act as a rake-arm, or it may be set to be acted on by the two cams $e^1$ $e^2$ on wheel $E^1$, causing every third arm to act; and if still greater frequency is desired the latch is moved over the standard $j$, which prevents it from dropping into engagement with the standard I and leaves the gate $C^1$ free to be thrown out by its spring. Thus arranged, the arm 1, acting first as a rake-arm, by its action on the heel-spur $c^x$ of the gate, swings the gate inward and holds it in this position until the succeeding roller passes outside the forward end of said gate, causing the arm 2 connected therewith to act as a reel-arm, when the spring again retracts the gate and causes arm 3 to act as a rake-arm; and so on, each alternate arm. The frequency of discharge of the gavel may be completely controlled by the operator at will from the seat by placing the tripping-latch on the post $j$ and drawing continually the cord which connects with the locking-lever hereinafter described, which will cause all arms to reel continuously until the cord is released; then it will rake instantly.

For causing all the arms to act as rake-arms for swathing the grain, a straight gate, or one without the heel-spur $c^x$, will be substituted for gate $c'$; or this straight gate may be used, if preferable, while the raking is caused by the inclines on the wheels E $E^1$ $E^2$, and the gate may then be closed by means of a lever connected to it, and pivoted to the outside of the cam, and located adjacent to the pendent stem on the front gate, so that the raking-arm may depress it, and thus close the gate. The number of rake-arms attached to the revolving head or disk A' may, of course, be varied, but the tripping-gears will require to be varied to suit. Thus, if a four-armed rake and reel is employed, the gear $E^2$, connected with the rake-shaft and revolving in the same time therewith, to use the same number of teeth as before for representing each arm, should have twelve cogs; the wheel $E^1$ may be the same as before, with its eighteen cogs and its three cams; and the wheel E may have fifteen cogs, representing five arms.

Additional tripping-gears may be employed over what is shown for increasing the number of changes that may be made in the delivery of the gavels, as desired, and these should be arranged in the arc of a circle, of which the latch swivel-pin $h$ is the center, so that the swinging end of the latch can be readily placed over the desired gear-wheel.

The number of cogs representing each rake may, of course, be other than that selected, either more or less—that used, viz., three being selected as the preferred one for illustration.

Sometimes, as in turning corners, it is desirable to prevent the grain from being discharged at the regular or set interval. For this purpose a lever, $k$, is pivoted underneath the cam-plate, from which a cord, $l$, extends to a convenient point to be acted upon by the foot or hand of the driver, and by drawing upon which the outer end of the lever is caused to drop down in front of a head or shoulder on the upper end of the swivel-pin $h$, or behind the switch itself, while the latch F is engaged with the standard, in such manner that when the latch is released the gate will be held by the lever $k$ until the latch again engages with the standard I.

A second lever may be employed, if desired, similarly arranged and controlled, for acting on the latch F to release it, when for any reason it becomes desirable to discharge the grain from the platform in advance of the rake acting automatically.

The latch F may be pivoted directly to the gate, by means of a pendent swivel-pin passing down through a slot or spring in the cam-plate, or in some other convenient manner, if preferred, thereby dispensing with the arm H.

By locating the gears, latches, &c., underneath and within the circle of the cam, they are protected from falling grain, and all danger of being injured. The common multiple arrangement of cogs in the gears permit the tripping cams or spurs $e$ to be located with entire precision relative to the rake-arms, and effectually obviates all danger of collision of the rake-roller with the forward end of the gate.

Having now described my invention, what I claim as new, and desire to secure by Letters Patent, is—

1. In an automatic rake-trip, two or more differential tripping-gears, having a fixed relation, substantially as described.

2. The gear-wheel $E^2$, for driving the differential tripping-pinions, provided with the tripping spur or incline $e$ on its side, and mounted upon and driven by the rake-shaft, for the purpose described.

3. The secondary spur-wheel $E^1$, provided with two or more tripping spurs or inclines, for varying the size of the gavel.

4. The reciprocating trip-latch, in combination with the cam-gate and retaining-lever $k$.

5. The adjustable trip-guide standard I, made separate from and independent of the studs or posts upon which the tripping-gears rotate.

6. The combination of two or more differential tripping-gears, having a fixed relation, and the swinging adjustable trip-latch, substantially as described.

7. The swivel-pin $h$, to which the swinging trip-latch is attached, provided with a head or shoulder on its end, substantially as and for the purpose described.

8. The post $j$, or its equivalent, for holding the latch F out of action.

9. The adjustable trip-latch and the series of two or more permanent differential tripping-gears, arranged within the vertical plane of the circle traversed by the rollers of a harvester-rake, substantially as described.

10. The combination, with an automatic differential-gear trip, of a trip, controlled by the attendant for enabling him to deliver a gavel instantly, at will, by the first approaching rake-arm after sufficient grain has accumulated to form a gavel.

11. The combination, with the cam-gate of a harvester, of an automatic differential-gear trip, and of a supplemental trip, operated by the driver for controlling the action of the rake-arms without stopping the rotation of the automatic tripping-gears.

12. An automatic differential-gear trip having its entire mechanical parts in adjustment, obviating the necessity for any increase, diminution, or interchange of parts, in combination with a harvester-rake having three or more rakes, any one or all of which may be made to rake off the gavel or to reel only, at the will of the operator.

JACOB H. MYERS.

Witnesses:
ALEXANDER MAHON,
THEODORE MYERS.